United States Patent
You et al.

(10) Patent No.: US 10,283,822 B2
(45) Date of Patent: May 7, 2019

(54) BATTERY MODULE ASSEMBLY (71) Applicant: SK Innovation Co., Ltd., Seoul (KR)

(72) Inventors: Gil Jae You, Daejeon (KR); Ji Seok Lee, Chungcheongbuk-do (KR); Hyun Jin Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 835 days.

(21) Appl. No.: 14/415,432

(22) PCT Filed: Jul. 19, 2013

(86) PCT No.: PCT/KR2013/006468
§ 371 (c)(1),
(2) Date: Jan. 16, 2015

(87) PCT Pub. No.: WO2014/014303
PCT Pub. Date: Jan. 23, 2014

(65) Prior Publication Data
US 2015/0194714 A1  Jul. 9, 2015

(30) Foreign Application Priority Data
Jul. 19, 2012 (KR) ........................ 10-2012-0078885

(51) Int. Cl.
*H01M 10/613* (2014.01)
*H01M 10/60* (2014.01)
(Continued)

(52) U.S. Cl.
CPC .... *H01M 10/6552* (2015.04); *F28D 15/0233* (2013.01); *F28D 15/0275* (2013.01);
(Continued)

(58) Field of Classification Search
CPC .......... H10M 10/6552; H10M 10/613; H10M 10/625; H10M 10/647; H10M 10/6556;
(Continued)

(56) References Cited

U.S. PATENT DOCUMENTS 9,196,938 B2   11/2015  Yoon
9,385,404 B2   7/2016   Yoon et al.
(Continued)

FOREIGN PATENT DOCUMENTS

CN   101855748 A   10/2010
CN   102315501 A   1/2012
(Continued)

OTHER PUBLICATIONS

CN201380043980.7, Office Action, dated May 27, 2016 (including English language translation), 11 pages.
(Continued)

*Primary Examiner* — Magali P Slawski
*Assistant Examiner* — Kourtney R S Carlson
(74) *Attorney, Agent, or Firm* — Abelman,Frayne & Schwab (57) ABSTRACT

A battery module assembly according to one embodiment of the present invention includes: a heat pipe having a battery module in which a plurality of battery cells are stacked in one direction, a coupling part which is in contact with and coupled to the side surface part of the battery module, and a cooling part which extends from the coupling part so as to project away from the battery module; and a cooling plate, one surface of which is in contact with and coupled to the cooling part of the heat pipe. A cooling passage may be formed on the other surface of the cooling plate. According to the present invention, heat generated from the battery module including the battery cell can be cooled effectively.

7 Claims, 10 Drawing Sheets

(51) Int. Cl.

| | | |
|---|---|---|
| *H01M 10/6552* | (2014.01) | |
| *H01M 10/659* | (2014.01) | |
| *F28D 15/02* | (2006.01) | |
| *F28F 1/00* | (2006.01) | |
| *H01M 10/647* | (2014.01) | |
| *H01M 10/625* | (2014.01) | |
| *H01M 10/6556* | (2014.01) | |
| *H01M 10/6569* | (2014.01) | |

(52) U.S. Cl.
CPC ............. *F28F 1/00* (2013.01); *H01M 10/613* (2015.04); *H01M 10/625* (2015.04); *H01M 10/647* (2015.04); *H01M 10/6556* (2015.04); *H01M 10/6569* (2015.04); *H01M 2220/20* (2013.01)

(58) Field of Classification Search
CPC ............ H10M 10/6569; F28D 15/0233; F28D 15/0275; F28F 1/00
See application file for complete search history.

(56) References Cited

U.S. PATENT DOCUMENTS

| | | | |
|---|---|---|---|
| 2008/0113229 | A1 | 5/2008 | Oh |
| 2012/0009455 | A1* | 1/2012 | Yoon ..................... H01M 10/65 |
| | | | 429/120 |
| 2012/0040223 | A1* | 2/2012 | Odumodu ........... H01M 2/1077 |
| | | | 429/120 |

FOREIGN PATENT DOCUMENTS

| | | |
|---|---|---|
| JP | 2007-257843 A | 10/2007 |
| JP | 2012-018915 A | 1/2012 |
| KR | 10-2005-0069075 A | 5/2005 |
| KR | 10-0067943 B1 | 1/2007 |
| KR | 10-2012-0075431 A | 7/2012 |

OTHER PUBLICATIONS

International Search Report for PCT/KR2013/006468 dated Oct. 24, 2013 (2 pages).

* cited by examiner

BATTERY MODULE ASSEMBLY

RELATED APPLICATIONS

This application is a U.S. national phase application under 35 USC § 371 of PCT/KR2013/006468 filed on Jul. 19, 2013, and claims the benefit under 35 USC § 119 of Korean patent application number KR 10-2012-0078885 filed Jul. 19, 2012, the disclosures of which are incorporated herein by reference in their entireties.

TECHNICAL FIELD

The present invention relates to a battery module assembly.

BACKGROUND ART

As mobile electronic devices, such as video cameras, mobile phones, mobile computers, become lighter and multifunctional, technologies concerning secondary batteries that are used as a power source for driving such mobile devices have been actively studied. Secondary batteries include, for example, nickel-cadmium batteries, nickel-hydrogen batteries, nickel-zinc batteries, lithium secondary batteries. Among these, lithium secondary batteries have become widely used due to their advantages, such as coming in various sizes and having a high operation voltage and high energy density.

According to Korean Patent Application Publication No. 2005-0069075, rechargeable secondary batteries are recently receiving attention as a driving power source for Electric Vehicles (EV), Hybrid Electric Vehicles (HEV), Plug-in Hybrid Electric Vehicles (P-HEV), etc. as they are considered a solution to air pollution, which is caused by existing gasoline vehicles, diesel vehicles, etc. all of which use fossil fuel. Unlike compact mobile devices, a medium- or large-sized battery module in which many battery cells are connected to each other depending on demanded output power is used for a medium- or large-sized apparatus such as a vehicle.

Conventionally, various cooling systems for dissipating heat generated by battery modules containing secondary battery cells therein have been used. Specifically, there is an air cooling system in which battery cells are stacked with a gap therebetween and an air channel is formed in the gap. The air cooling system has a disadvantage of low cooling efficiency attributable to a narrow air channel. Moreover, it is difficult to effectively and sufficiently dissipate the heat generated by battery cells because the cooling is performed using only the gap having a limited size between stacked battery cells. Therefore, operation performance or driving stability of devices that use the battery cells is dramatically deteriorated.

DISCLOSURE

Technical Problem

Accordingly, the present invention has been made keeping in mind the above problems occurring in the related art, and an object of the present invention is to provide a battery module assembly that transfers heat generated from battery cells through a heat pipe installed to be in contact with an outer surface of a battery module in which the battery cells are stacked, and that dissipates the heat transferred through the heat pipe using a cooling plate. The battery module assembly improves efficiency and reliability of cooling, thereby improving operation performance of a device that uses the battery module.

Technical Solution

In order to accomplish the object, an aspect provides a battery module assembly including: a battery module in which a plurality of battery cells is stacked in a direction; a heat pipe including a coupling portion that is in contact with and coupled to a side surface of the battery module, and a cooling portion that extends from the coupling portion and protrudes outward from the side surface of the battery module; a cooling plate having a first main surface that is in contact with and coupled to the cooling portion of the heat pipe, and a second main surface in which a cooling channel is formed.

In the battery module, the plurality of battery cells may be stacked in a lateral direction such that main surfaces of the battery cells are in surface contact with each other.

The heat pipe may have at least one or more fluid holes through which coolant flows.

The heat pipe may be installed to be in contact with and coupled to left and right surfaces and a bottom surface of the battery module.

The cooling portion of the heat pipe may extend from the coupling portion and bent outward from the coupling portion in a radial direction of the battery module.

The cooling plate may include a first cooling plate and a second cooling plate, in which a first main surface of the first cooling plate is coupled to a first main surface of the cooling portion, a first main surface of the second cooling plate is coupled to a second main surface of the cooling portion, and cooling channels are formed in second main surfaces of the first cooling plate and the second cooling plate, respectively.

The heat pipe and the side surface of the battery module are coupled to each other via heat-conductive filler.

In the battery module, the battery cells may be stacked and the stacked battery cells may be coupled to each other via a heat-conductive filler.

The battery cell may be a pouch-shaped secondary battery.

Coolant may flow through the heat pipe, and heat generated by the battery module may be transferred to the cooling portion through phase transitions of the coolant.

The heat pipe may be formed of a one-piece part to surround surfaces of the battery module, including left and right surfaces and a bottom surface.

The heat pipe may include: a first heat pipe that is a one-piece part surrounding a first side surface and a portion of the bottom surface of the battery module; a second heat pipe that is a one-piece part surrounding a second side surface and a portion of the bottom surface of the battery module, in which on the bottom surface, an end of the first heat pipe is distanced from an end of the second heat pipe, with a gap therebetween.

Another aspect provides a battery module assembly including: a battery module in which a plurality of battery cells is stacked in a direction; a module case that houses the battery module and is heat-conductive; a first heat pipe including a first coupling portion that is in contact with and coupled to a first side surface of the module case, and a first cooling portion that extends from the first coupling portion and protrudes outward from the first side surface of the module case; a second heat pipe including a second coupling portion that is in contact with and coupled to a second side surface of the module case, and a second cooling portion that extends from the second coupling portion and protrudes outward from the second side surface of the module case; a first cooling plate having a first main surface that is in contact with and coupled to a first main surface of the first cooling portion and a second main surface in which a first cooling channel is formed; and a second cooling plate having a first main surface that is in contact with and coupled to a first main surface of the second cooling portion and a second main surface in which a second cooling channel is formed.

The battery module assembly may further include a support plate that is disposed under a bottom surface of the module case and installed to cover end portions of the first heat pipe and the second heat pipe.

The first cooling portion and the second cooling portion may extend from the first heat pipe and the second heat pipe, respectively, and be bent outward to protrude from the module case.

The module case may be an aluminum case.

In the battery module, the plurality of battery cells may be stacked in a lateral direction such that main surfaces of the battery cells are in surface contact with each other.

The first cooling plate may include a first upper cooling plate that is in contact with and coupled to a first main surface of the first cooling portion and a first lower cooling plate that is in contact with and coupled to a second main surface of the first cooling portion; and the second cooling plate includes a second upper cooling plate that is in contact with and coupled to a first main surface of the second cooling portion and a second lower cooling plate that is in contact with and coupled to a second main surface of the second cooling portion.

The first heat pipe and the second heat pipe may be coupled to the first and second side surfaces of the module case via a heat-conductive filler.

In the battery module, the battery cells may be stacked, and the stacked battery cells may be coupled to each other via a heat-conductive filler.

The battery cell may be a pouch-shaped secondary battery.

Coolant may flow through fluid holes formed in the first and second heat pipes, and heat generated by the battery module may be transferred to the first and second cooling portions through phase transition of the coolant.

The above and other objects, features and advantages of the present invention will be more clearly understood from the following detailed description when taken in conjunction with the accompanying drawings.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Advantageous Effects

According to the present invention, the battery module assembly has an advantage of effectively dissipating heat generated by a battery module that includes battery cells therein.

In addition, since at least one or more battery cells are stacked to be in surface contact with each other, heat can be effectively transferred through the heat pipe that is in tight contact with the outer surface of the battery module.

In addition, since the cooling plate is coupled to the cooling portion of the heat pipe and has a cooling channel therein, when the heat generated by the battery cells is transferred through the heat pipe to the cooling portion disposed at an outer end of the heat pipe through which cooling water follows, the battery module can be effectively cooled.

In addition, the heat pipe, which transfers the heat generated by the battery cells, is formed as a plate with a plurality of fluid holes therein so that more effective heat transfer can be obtained.

In addition, when many battery cells are stacked such that their main surfaces are in contact with each other, since the battery cells are coupled to each other via a heat-conductive filler, more effective heat conduction to the heat pipe that is in contact with the outer surface of the battery module is obtained. Therefore, cooling efficiency of the battery module is improved.

In addition, the heat pipe is cooled by the cooling channel formed in the cooling plate coupled to the heat pipe. Moreover, since the heat pipe is cooled through a water cooling system that uses cooling water circulating through a closed loop channel, the battery module can be more stably cooled.

In addition, since the heat generated by the battery cells included in the battery module is effectively transferred to the heat pipe, and the transferred heat is cooled using the cooling plate, operation performance and driving stability of a device to which the battery module is applied can be improved and secured.

In addition, since manufacturing of the battery module becomes easy, lead time of the battery module assembly can be reduced, resulting in an increase in productivity of the battery module assembly.

MODE FOR INVENTION

The above and other objects, features and other advantages of the present invention will be more clearly understood from the following detailed description when taken in conjunction with the accompanying drawings. As for reference numerals associated with parts in the drawings, it should be noted that the same reference numerals will refer to the same or like parts through the drawings. It will be understood that, although the terms "one side," "the other side", "first," "second," etc. may be used herein to describe various elements, these elements should not be limited by these terms. These terms are only used to distinguish one element from another element. In the description, details of well-known features and techniques may be omitted to avoid unnecessarily obscuring the presented embodiments.

Hereinafter, embodiments of the present invention will be described with reference to the accompanying drawings.

Figure 1:
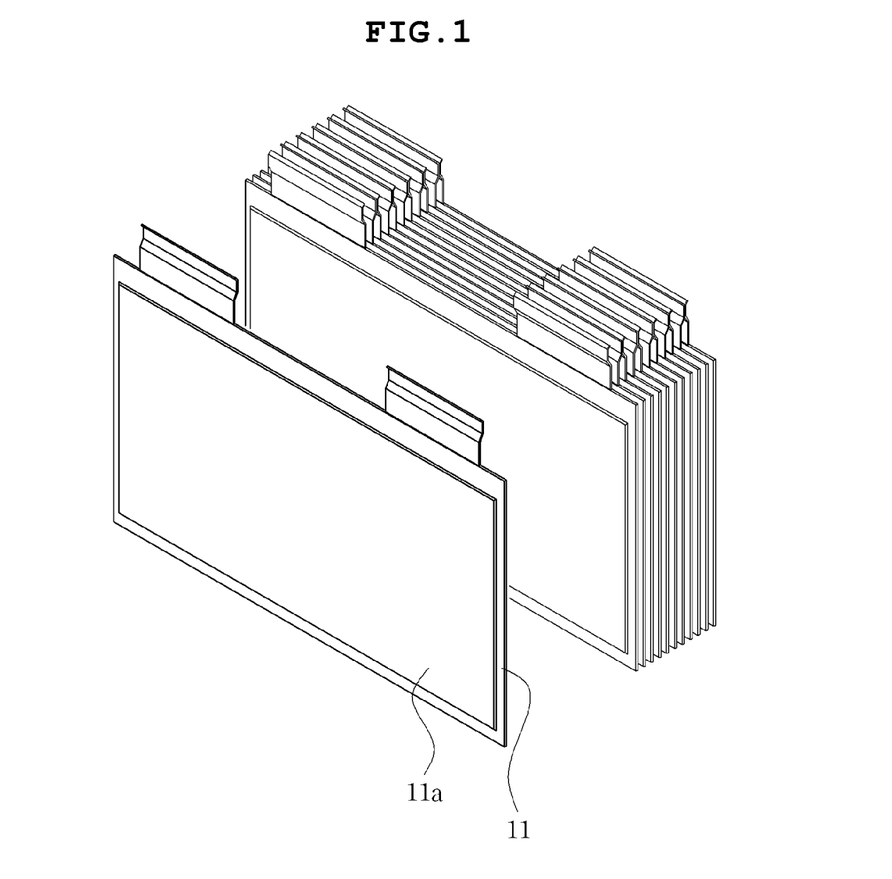
FIG. 1 is a perspective view illustrating a direction in which battery cells are stacked according to the present invention.
Figure 2:
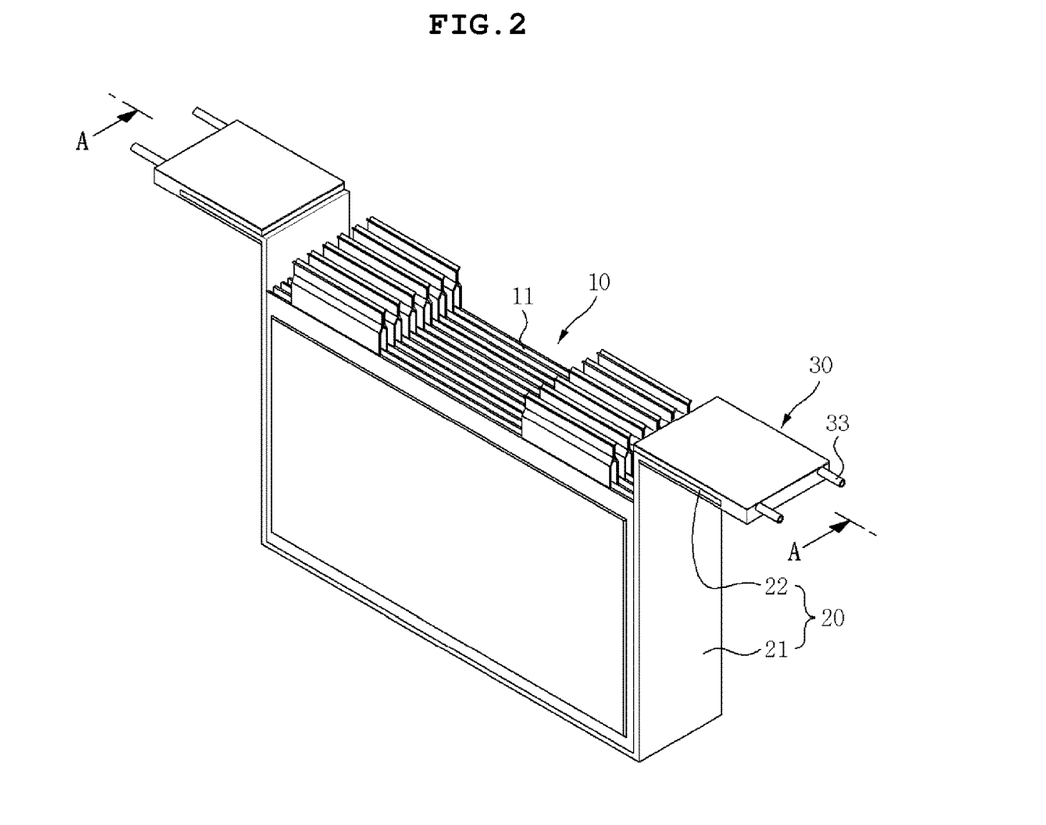
FIG. 2 is a perspective view illustrating a battery module assembly according to one embodiment of the present invention.
Figure 3:
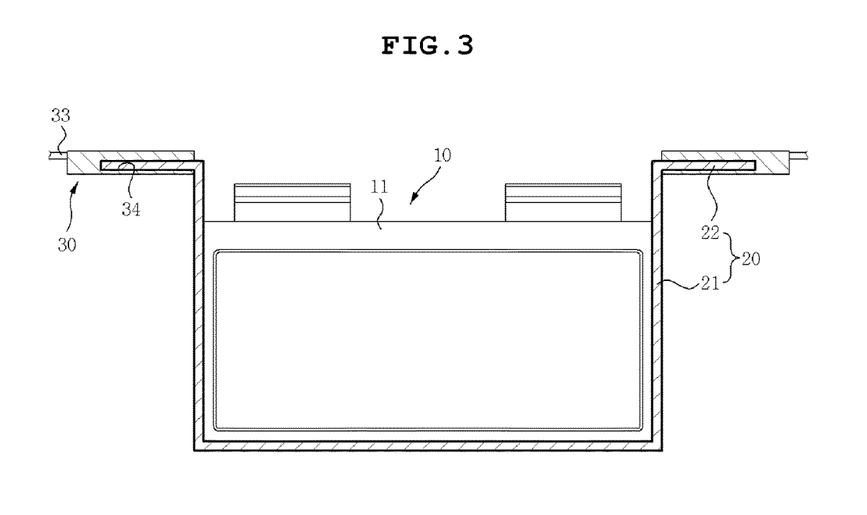
FIG. 3 is a cross-sectional view taken along line A-A of FIG. 2.
Figure 4:
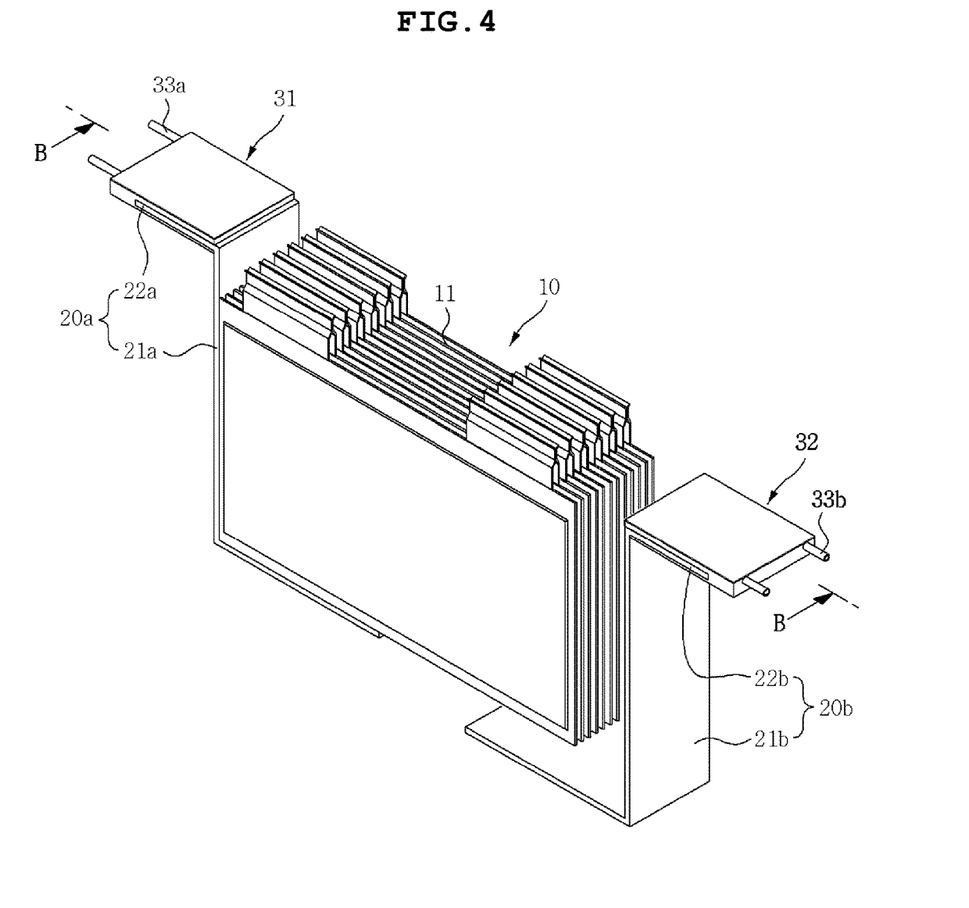
FIG. 4 is a perspective view illustrating a battery module assembly according to another embodiment of the present invention.
Figure 5:
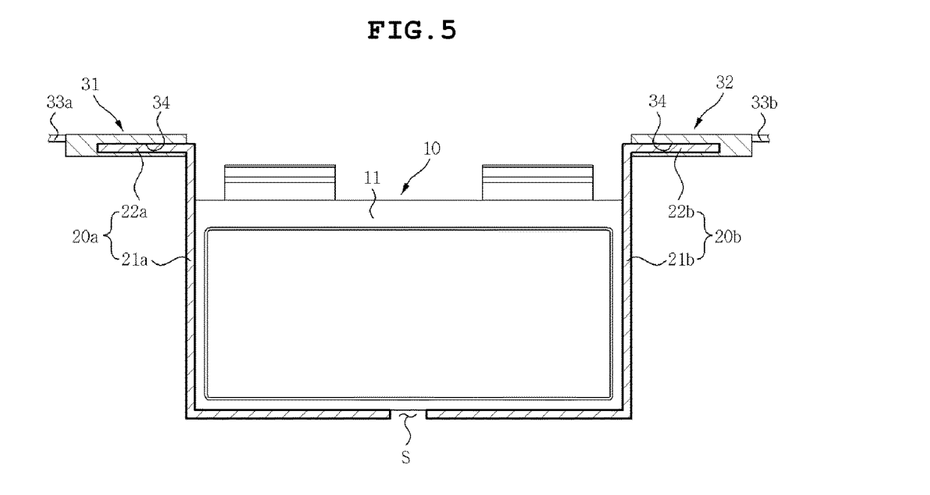
FIG. 5 is a cross-sectional view taken along line B-B of FIG. 4.

FIG. 1 is a perspective view illustrating a direction in which battery cells are stacked according to the present invention; FIG. 2 is a perspective view illustrating a battery module assembly according to one embodiment of the present invention; FIG. 3 is a cross-sectional view taken along line A-A of FIG. 2; FIG. 4 is a perspective view illustrating a battery module assembly according to another embodiment of the present invention; and FIG. 5 is a cross-sectional view taken along line B-B of FIG. 4.

A battery module assembly according to one embodiment of the present invention includes: a battery module 10 in which a plurality of battery cells 11 is stacked in a direction; a heat pipe 20 having a coupling portion 21 that is in contact with and coupled to a side surface of the battery module 10 and a cooling portion 22 that extends from the coupling portion 21 and protrudes outward from the side surface of the battery module 10; and a cooling plate 30 having a first main surface that is coupled to the cooling portion 22 and a second main surface in which a cooling channel 33 is formed.

Each battery cell 11 included in the battery module 10 of the battery module assembly according to the present invention may be a rechargeable secondary battery that can be discharged and recharged, such as a lithium secondary battery or a nickel-hydrogen secondary battery. However, the battery cell is not limited to these secondary batteries. Those skilled in the art will appreciate that various kinds of secondary batteries can be selected and used as the battery cells as long as the selected secondary batteries are rechargeable. For example, a nickel-hydrogen secondary battery is a secondary battery in which nickel is used as an anode material, a hydrogen storage alloy is used as a cathode material, and an alkali aqueous solution is used as electrolyte. The nickel-hydrogen secondary battery has a large capacity per unit volume. Therefore, it is suitably used as an energy source for electric vehicle (EV) or a hybrid electric vehicle (HEV). Specifically, a lithium secondary battery uses a metal oxide such as $LiCoO_2$ as an anode active material and a carbon material as a cathode active material and includes a porous polymer separator interposed between an anode and a cathode. The lithium secondary battery further includes a non-aqueous electrolyte solution containing a lithium salt such as $LiPF_6$ between the anode and cathode. During charging, lithium ions are released from the anode active material and move into a carbon layer on the cathode. Conversely, during discharging, lithium ions are released from the carbon layer on the cathode and move into the anode active material. The non-aqueous electrolyte solution functions as a medium through which lithium ions move between the anode and cathode. Lithium ion batteries have high energy density, a high operation voltage, and good storage characteristics. The lithium ion batteries can be applied to or used for various electronic products as well as being used as an energy source for EV or HEV.

A lithium secondary battery may be a box-shaped battery or a pouch-shaped battery that includes an electrode assembly and a pouch-shaped case which houses the electrode assembly. The pouch-shaped case may be formed by preparing a thin metal plate such as a thin aluminum plate and by performing insulation processing in which the surface of the thin metal plate is treated so as to be insulating. The insulation processing is performed by applying transformed polypropylene (polymer resin), for example, Casted Polypropylene (CPP) as a thermally fused layer on the surface and forming a resin layer such as polyethylene terephthalate (PET) or nylon thereon. This structure is described as only an example of the lithium secondary battery. Accordingly, those skilled in the art will appreciate that the structure may vary according to the shape and kind of a battery.

The battery cells 11 may be various shapes of secondary batteries such as box-shaped batteries or pouch-shaped batteries as described above. With reference to FIG. 1, an example in which pouch-shaped battery cells are used will be described. As illustrated in FIG. 1, the battery cells 11 are stacked such that their main surfaces 11a are in contact with each other, forming the battery module 10. Since the battery cells 11 are coupled to each other such that their main surfaces 11a face each other, heat generated by the battery cells 11 is more easily transferred to the outer surface of the battery module 10 in which the battery cells 11 are stacked. Because of this stacking manner of the battery cells 11, the battery module 10 can be cooled via the heat pipe 20 and the cooling plate 30. When the battery cells 11 are stacked such that their main faces 11a are in contact with each other, the battery cells 11 may be coupled to each other using a double-sided tape. Alternatively, the battery cells 11 may be coupled to each other using heat-conductive filler to make smooth heat conduction. In one battery module 10, the stacked battery cells 11 are arranged in a lateral direction while their main surfaces face each other.

The heat pipe 20 includes the coupling portion 21 that is in contact with and coupled to the outer side surface of the battery module and the cooling portion 22 that extends from the coupling portion 21 and protrudes outward from the side surface of the battery module 10. The coupling portion 21 and the cooling portion 22 may be formed as a one-piece part, or may be prepared as separate members to be assembled to be an assembled part. When the heat pipe 20 is coupled to the bottom surface and left and right surfaces of the battery module 10, it may be coupled via heat-conductive filler to improve a heat conduction effect. Various types of filler, such as thermal grease or thermal pad, may be used as the filler.

As illustrated in FIG. 2, the coupling portion 21 of the heat pipe 20 is installed in a surface contact manner to surround the left and right surfaces of the battery module 10 in which the battery cells 10 are stacked. Preferably, the heat pipe 20 is coupled to be in surface contact with the left and right surfaces of the battery module 10, thereby easily transferring the heat generated by the battery cells 11.

The cooling portion 22 of the heat pipe 20, as illustrated in FIG. 2, extends from the coupling portion 21 of the heat pipe 20 that surrounds the side surfaces and the bottom surface of the battery module 10, and the cooling portion 22 protrudes from the side surfaces of the battery module 10. The heat generated by the battery cells 11 is transferred to the cooling portion 22 via the coupling portion 21, and then cooled by the cooling plate 30. As illustrated in FIGS. 2 and 3, the cooling plate 22 is bent outward in a radial direction of the battery module 10 from the coupling portion 21. That is, the cooling plate 22 extends from the coupling portion 21. The coupling portion 21 and the cooling portion 22 may be manufactured as a one-piece part, or as separate members that are assembled later to be an assembled part, depending on the shape of the battery module 10.

As illustrated in FIGS. 4 and 5, the heat pipe 20 may be manufactured as separate members: a first heat pipe 20a that is in contact with the left surface and a portion of the bottom surface of the battery module, and a second heat pipe 20b that is in contact with the right surface and another portion of the bottom surface of the battery module 10. A gap S is formed in a middle portion of the bottom surface of the battery module 10, between the first heat pipe 20a and the second heat pipe 20b. That is, coupling portions 21 and cooling portions 22 for left and right sides, respectively can more effectively cool the heat generated by the battery cells 11.

Figure 10:
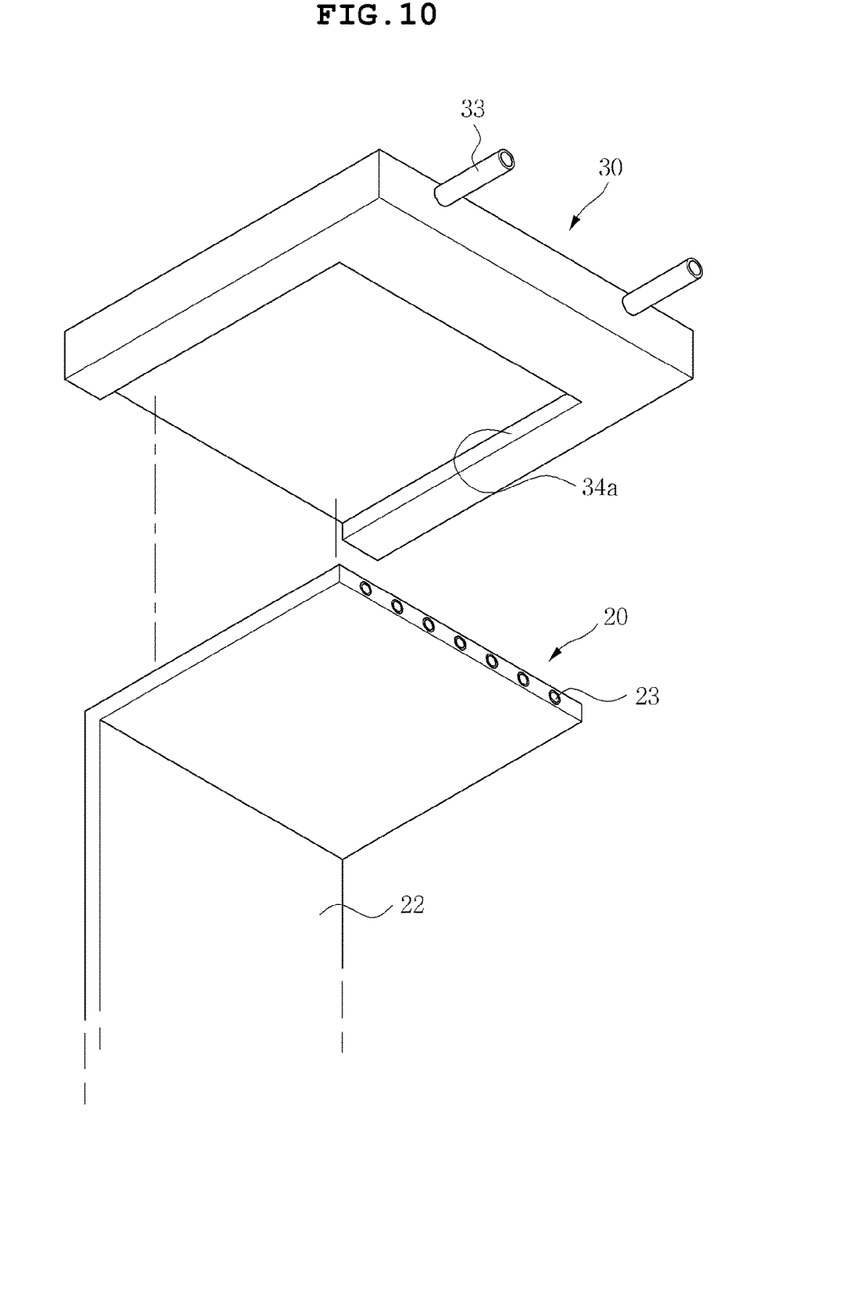
FIG. 10 is a perspective view illustrating a coupling structure of a cooling plate according to a further embodiment of the present invention.

As illustrated in FIG. 2, the cooling plate 30 may be formed to be in contact with one main surface of the cooling portion 22 of the heat pipe 20. A first main surface of the cooling plate 30 is in contact with the top surface of the cooling portion 22, and an inside of the cooling plate 30 has the cooling channel 33 for dissipating the heat of the cooling portion 22. The cooling channel 33 may be a closed-loop channel and can be cooled by a water cooling method. When the battery module 10 is mounted in a vehicle or the like, cooling water used in the vehicle can be used as the cooling water for cooling the cooling portion. To couple the cooling plate 30 to the cooling portion 22 of the heat pipe 20, as illustrated in FIG. 2, the cooling plate 30 may have a coupling recess 34 and the cooling portion 22 may be inserted into the coupling recess 34. However, those skilled in the art will appreciate that any coupling method can be used as long as the cooling plate 30 is coupled in a such manner that the cooling portion 22 is inserted into the cooling plate 22. For example, as illustrated in FIGS. 2 to 9, the coupling recess 34 is formed in the cooling plate 33 so that the cooling portion 22 can be inserted into the coupling recess 34. Alternatively, as illustrated in FIG. 10, the cooling plate may have a step-shaped portion 34a to be in surface contact with the cooling portion.

Figure 8:
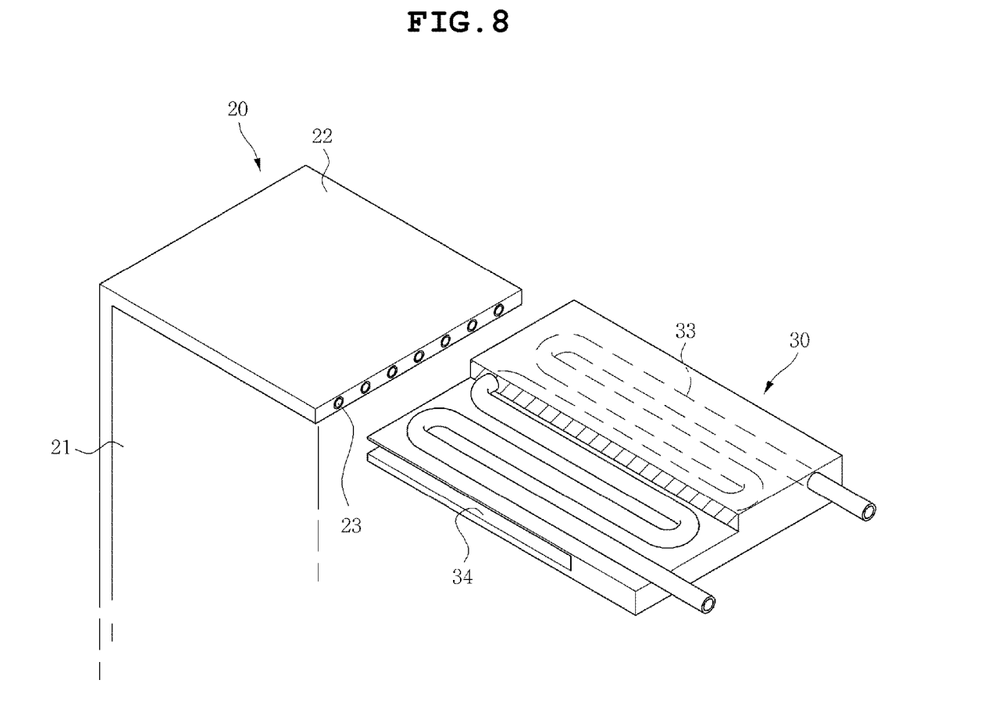
FIG. 8 is a perspective view illustrating a coupling structure of a cooling plate according to one embodiment of the present invention.
Figure 9:
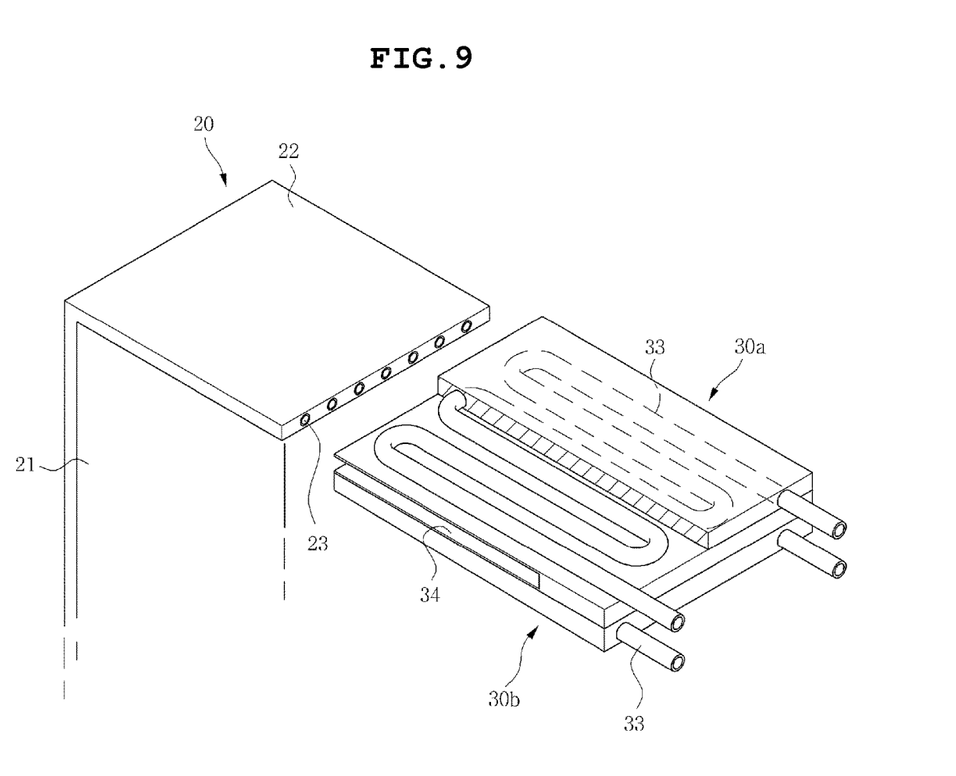
FIG. 9 is a perspective illustrating a coupling structure of a cooling plate according to another embodiment of the present invention.

As illustrated in FIGS. 8 and 9, the cooling plate 30 may have the cooling channel 33 therein. Since the cooling channel 33 is formed in the cooling plate 30, it is possible to prevent the cooling channel 33 from being damaged or deformed by external impact or vibration.

As illustrated in FIG. 8, the heat pipe 20 may be a plate-shaped heat pipe 20 inside of which is provided with a plurality of fluid holes 23 through which coolant flows. As coolant circulates through the fluid holes 23, the heat generated by the battery cells 11 is effectively transferred to the cooling portion 22 of the heat pipe 20. Specifically, the heat pipe 20 that is in contact with the outer side surfaces and the bottom surface of the battery module 10 in which multiple battery cells 11 are stacked receives the heat generated by the battery cells 11. The coolant contained in the fluid holes 23 formed in the coupling portion 21 of the heat pipe 20 absorbs the generated heat and evaporates. The vaporized coolant in a gaseous state moves to the cooling portion 22 of the heat pipe 20 along the center portion of the fluid holes 23 formed in the heat pipe 20. The coolant in the heat pipe 20 condenses at the cooling portion 22 of the heat pipe 20 as it is cooled by the cooling plate 30, and turns into a liquid state. At this point, the condensed coolant moves back to the coupling portion 21 of the heat pipe 20 along the inside wall of the fluid holes 23 formed in the heat pipe 20. As this process is repeated, the heat generated by the battery cells 11 is transferred from the coupling portion 21 to the cooling portion 22 of the heat pipe 20, and the transferred heat is cooled by the cooling plate 30.

The cooling plate 30 may be disposed at one side of the cooling portion 22 of the heat pipe 20 as illustrated in FIG. 8. Alternatively, the cooling plate 30 may be disposed at both sides of the cooling portion 22. In this case, the cooling portion 22 can be more effectively cooled. Specifically, the cooling plate 30 may be composed of an upper cooling plate 30a and a lower cooling plate 30b. A first main surface of the upper cooling plate 30a may be coupled to a first main surface of the cooling portion 22 and a first main surface of the lower cooling plate 30b may be coupled to a second main surface of the cooling portion 22. Cooling channels 33 are formed in second main surfaces of the upper cooling plate 30a and lower cooling plate 30b, so that water cooling can be performed.

Figure 6:
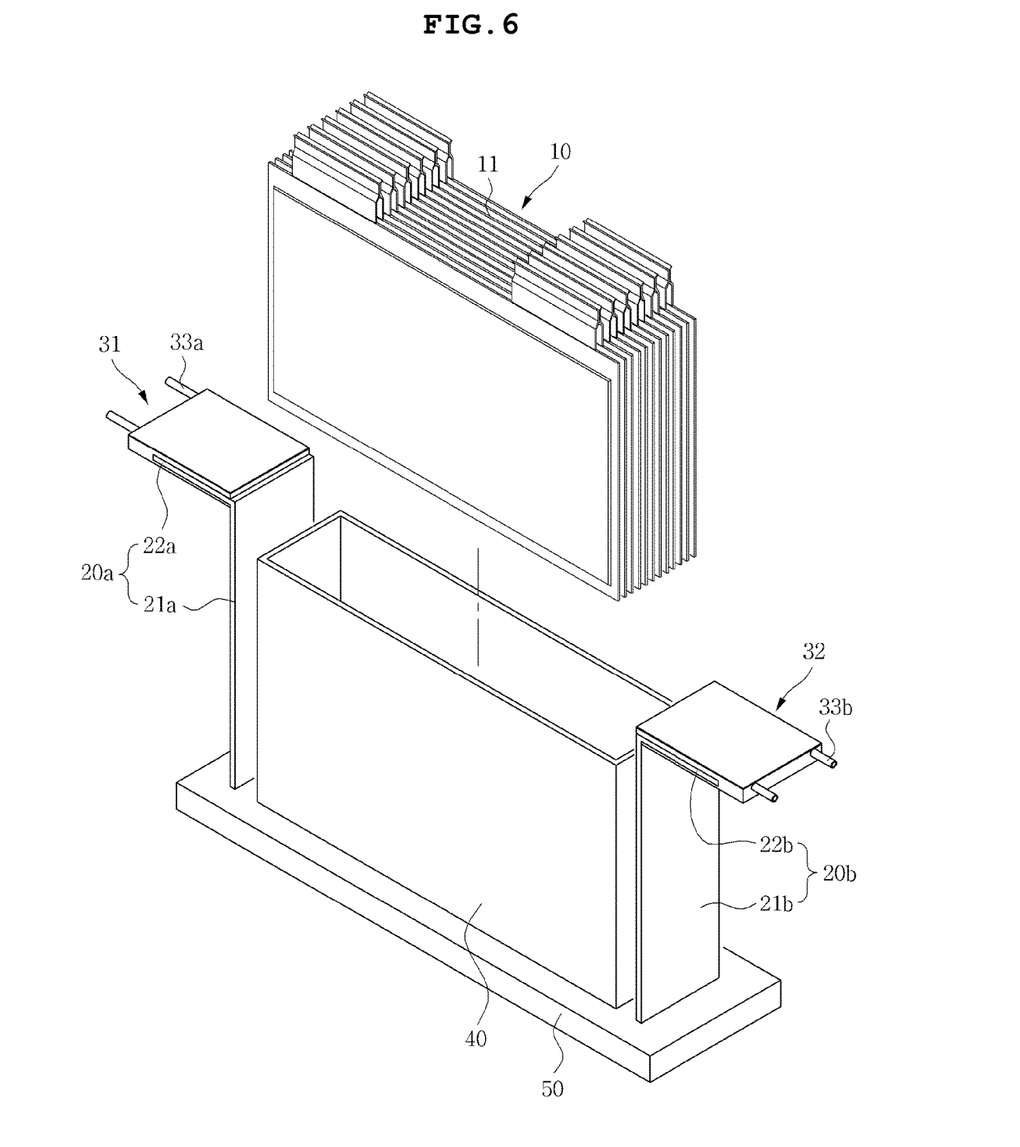
FIG. 6 is an exploded perspective view illustrating a battery module assembly according to a further embodiment of the present invention.
Figure 7:
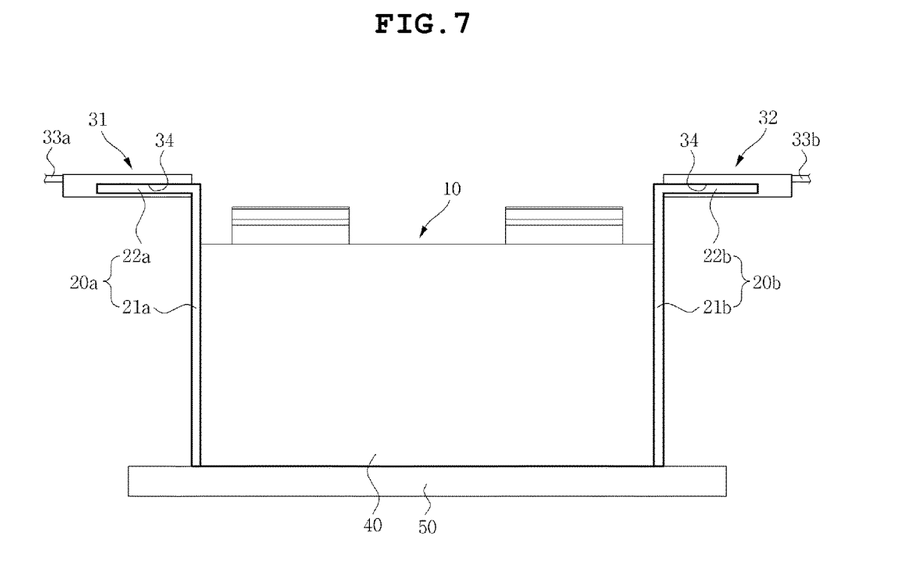
FIG. 7 is a cross-sectional view illustrating the battery module assembly according to the embodiment of the present invention.

FIG. 6 is an exploded perspective view illustrating a battery module assembly of a battery module 10 according to a further embodiment of the present invention; and FIG. 7 is a cross-sectional view illustrating the battery module assembly of the battery module 10 according to the embodiment of the present invention.

The battery module assembly according to the present embodiment includes: the battery module 10 in which a plurality of battery cells 11 is stacked in one direction; a module case 40 that houses the battery module 10 and is heat-conductive; a first heat pipe 20a including a first coupling portion 21a that is in contact with and coupled to a first side surface of the module case 40, and a first cooling portion 22a that extends from the first coupling portion 21a and protrudes outward from the first side surface of the module case 40; a second heat pipe 20b including a second coupling portion 21b that is in contact with and coupled to a second side surface of the module case, and a second cooling portion 22b that protrudes outward from the second side surface of the module case 40; a first cooling plate 31 having a first main surface that is in contact with a first main surface of the first cooling portion 22a and a second main surface in which a first cooling channel 33a is formed; and a second cooling plate 32 having a first main surface that is in contact with and coupled to a first main surface of the second cooling portion 22b and a second main surface in which a second cooling channel 33b is formed.

The present embodiment is different from the battery module assembly of the battery module 10 according to the previously-described embodiment in that the present embodiment further includes the module case 40 that houses the battery module 10. Therefore, the first heat pipe 20a and the second heat pipe 20b that surround left and right surfaces of the module case, respectively are prepared. In addition, separate heat pipes 20 are formed to be disposed on the left and right sides of the module case 40 that houses the battery module 10. A support plate 50 may support the bottom surfaces of the module case and the heat pipes. Among descriptions about parts of the present embodiment, descriptions about parts that have been given already in conjunction with the previous embodiment will be omitted here.

As described above, the battery cells 11 may be pouch-shaped or box-shaped secondary batteries or other shapes of secondary batteries. As illustrated in FIG. 1, the present embodiment also takes an example in which pouch-shaped battery cells are used. More details about this point will be omitted to avoid a duplication of description.

The module case 40 houses the battery module 10 and is made of a heat-conductive material. Specifically, an aluminum case can be used as the module case 40, but the material of the module case 40 is not limited thereto. Any material can be used as long as it is thermally conductive. As illustrated in FIG. 6, the module case 40 is structured to accommodate the battery module 10. In particular, the present embodiment features that the heat pipe 20 is coupled to the side surface of the module case 40 in which the battery module 10 is accommodated.

The heat pipe 20 includes the first heat pipe 20a and the second heat pipe 20b.

The first heat pipe 20a includes the first coupling portion 21a that is in contact with and coupled to the first side surface of the module case 40, and the first cooling portion 22a that extends from the first coupling portion 21a and protrudes outward from the first side surface of the module case 40. The first coupling portion 21a is in tight contact with the first side surface of the module case 40 to transfer the heat generated by the battery cells 11. When the first coupling portion 21a is in contact with the first side surface of the module case 40 and transfers the heat generated by the battery cells 11, the first cooling portion 22a connected to the first coupling portion 21a cools the heat. The first cooling portion 22a can be cooled by the first cooling plate 31 in which the cooling channel is formed.

The second heat pipe 20b includes the second coupling portion 21b that is in contact with and coupled to the second side surface of the module case 40, and the second cooling portion 22b that extends from the second coupling portion 21b and protrudes outward from the second side surface of the module case 40. The second coupling portion 21b is in tight contact with the second side surface of the module case 40 to transfer the heat generated by the battery cells 11. When the second coupling portion 21b is in contact with and coupled to the second side surface of the module case 40 and transfers the heat generated by the battery cells 11, the heat is cooled by the second cooling portion 22b that is connected to the second coupling portion 21b. The second cooling portion 22b can be cooled by the second cooling plate 32 in which the cooling channel 33 described below is formed. When the heat pipe 20 is coupled to left and right surfaces of the module case 40, it can be coupled using heat-conductive filler.

Since the internal construction of the heat pipe 20 and a method of transferring heat are the same as in the previous embodiment, detailed description thereof will be omitted.

The cooling plate 30 includes: the first cooling plate 31 having a first main surface that is in contact with the first main surface of the first cooling portion 22a and a second main surface in which the first cooling channel 33a is formed; and the second cooling plate 32 having a first main surface is in contact with the first main surface of the second cooling portion 22b and a second main surface in which the second cooling channel 33b is formed. The first cooling plate 31 and the second cooling plate 32 that perform cooling by being in contact with the first cooling portion 22a and the second cooling portion 22b, respectively are formed to correspond to the heat pipe including the first heat pipe 20a and the second heat pipe 20b. The operation principle in which the transferred heat is cooled by the cooling channel 33 of the cooling plate 30 and the condensed cooling water is returned to the coupling portion 21 of the heat pipe 20 has been described already. In addition, as described above, it is naturally understood that the cooling plate 30, as illustrated in FIGS. 8 and 9, can be coupled to the top and bottom surfaces of the cooling portion 22 of the heat pipe 20. Since a detailed description about the first cooling plate 31 and the second cooling plate 32 according to the present embodiment is a duplication of the description about the cooling plate 30 of the assembly of the battery module 10 according to the previous embodiment, it will be omitted.

The support plate 50 may be coupled to cover the bottom surface of the module case 40 that houses the battery module 10 and the bottom surfaces of the first and second heat pipes 20a and 20b. As illustrated in FIGS. 6 and 7, the support plate 50 is coupled to the bottom surface of the module case 40. The support plate 50 is formed of a non-heat-conductive material. Any material can be used for the support plate 50 as long as it can support the battery module 10.

Although the present invention has been described in detail with reference to specific embodiments, those embodiments are provided only for illustrative purposes. Therefore, a battery module assembly according to the present invention is not limited to the presented embodiments, but rather those skilled in the art will appreciate that various modifications, additions and substitutions are possible, without departing from the scope and spirit of the invention as disclosed in the accompanying claims.

Further, simple changes and modifications of the present invention are appreciated as included in the scope and spirit of the invention, and the protection scope of the present invention will be defined by the accompanying claims.

<Description of the Reference Numerals in the Drawings>

| | |
|---|---|
| 10: Battery module | 11: Battery cell |
| 11a: Main surface of battery cell | |
| 20: Heat pipe | 21: Coupling portion |
| 22: Cooling portion | 20a: First heat pipe |
| 20b: Second heat pipe | 21a: First coupling portion |
| 21b: Second coupling portion | |
| 22a: First cooling portion | |
| 22b: Second cooling portion | |
| 23: Fluid hole | 30: Cooling plate |
| 31: First cooling plate | 32: Second cooling plate |
| 33: Cooling channel | 30a: Upper cooling plate |
| 30b: Lower cooling plate | 33a: First cooling channel |
| 33b: Second cooling channel | |
| 34: Coupling recess | 34: Step-shaped portion |
| 40: Module case | 50: Support plate |

The invention claimed is:

1. A battery module assembly comprising:
   a battery module in which a plurality of battery cells are stacked in one direction;
   a heat pipe comprising: a coupling portion coupled to enclose both side surfaces perpendicular to the stacked direction and a bottom surface of the plurality of battery cells so as to be in direct contact with the plurality of battery cells respectively and a cooling portion extended from the coupling portion and protruding outwardly from the side surface of the battery module;
   a first cooling plate coupled to the cooling portion protruded from one side of the battery module; and
   a second cooling plate coupled to the cooling portion protruded from the other side of the battery module
   wherein the heat pipe has at least one or more fluid holes through which coolant flows,
   wherein the coolant absorbs heat of the battery module and flows from the coupling portion to the cooling portion, and wherein the coolant dissipates heat to the first cooling plate and the second cooling plate which cool the cooling portion and flows from the cooling portion to the coupling portion.

2. The battery module assembly according to claim 1, wherein in the battery module, the plurality of battery cells is stacked in a lateral direction such that main surfaces of the battery cells are in surface contact with each other.

3. The battery module assembly according to claim 1, wherein:
a first main surface of the first cooling plate is coupled to a first main surface of the cooling portion protruded from one side of the battery module;
a first main surface of the second cooling plate is coupled to a second main surface of the cooling portion protruded from the other side of the battery module; and
cooling channels are formed in second main surfaces of the first cooling plate and the second cooling plate, respectively.

4. The battery module assembly according to claim 1, wherein the heat pipe and the side surface of the battery module are coupled to each other via heat-conductive filler.

5. The battery module assembly according to claim 1, wherein coolant flows through the heat pipe, and heat generated by the battery module is transferred to the cooling portion through phase transitions of the coolant.

6. The battery module assembly according to claim 1, wherein the heat pipe is formed of a one-piece part to surround surfaces of the battery module, including left and right surfaces and a bottom surface.

7. The battery module assembly according to claim 1, wherein the heat pipe includes:
a first heat pipe coupled to enclose a left side surface of the battery module and a part of the bottom surface of the battery module extended from the left side surface of the battery module; and
a second heat pipe coupled to enclose a right side surface of the battery module and a part of the bottom surface of the battery module extended from the right side surface of the battery module and spaced part from the first heat pipe,
wherein the first cooling plate is coupled to the cooling portion of the first heat pipe protruded from one side surface of the battery module; and the second cooling plate coupled to the cooling portion of the second heat pipe protruded from the other side surface of the battery module.

* * * * *